US012676546B2

(12) United States Patent
Yamada

(10) Patent No.: US 12,676,546 B2
(45) Date of Patent: Jul. 7, 2026

(54) SWITCHING CONTROL CIRCUIT AND POWER FACTOR CORRECTION CIRCUIT

(71) Applicant: FUJI ELECTRIC CO., LTD.,
Kawasaki (JP)

(72) Inventor: Ryuji Yamada, Hachioji-city (JP)

(73) Assignee: FUJI ELECTRIC CO., LTD.,
Kawasaki (JP)

( * ) Notice: Subject to any disclaimer, the term of this patent is extended or adjusted under 35 U.S.C. 154(b) by 201 days.

(21) Appl. No.: 18/357,371

(22) Filed: Jul. 24, 2023

(65) Prior Publication Data

US 2024/0072648 A1     Feb. 29, 2024

(30) Foreign Application Priority Data

Aug. 31, 2022     (JP) ................................. 2022-138074

(51) Int. Cl.
*H02M 1/42*          (2007.01)
*H02M 1/00*          (2007.01)
*H02M 1/40*          (2007.01)

(52) U.S. Cl.
CPC ....... *H02M 1/4225* (2013.01); *H02M 1/0025* (2021.05); *H02M 1/40* (2013.01)

(58) Field of Classification Search
CPC .... H02M 1/42; H02M 1/4208; H02M 1/4225; H02M 1/0025; H02M 1/40
See application file for complete search history.

(56) References Cited

U.S. PATENT DOCUMENTS

| | | | |
|---|---|---|---|
| 2010/0109626 A1 | 5/2010 | Chen | |
| 2012/0235649 A1* | 9/2012 | Uno | H02M 1/4225 |
| | | | 323/210 |
| 2014/0285163 A1* | 9/2014 | Lin | H02M 1/4225 |
| | | | 323/205 |

(Continued)

FOREIGN PATENT DOCUMENTS

| | | |
|---|---|---|
| JP | 2010-104218 A | 5/2010 |
| JP | 2013509141 A | 3/2013 |

(Continued)

OTHER PUBLICATIONS

Office Action issued in corresponding Japanese patent application No. 2022-138074, and its English translation, dated May 19, 2026.

*Primary Examiner* — Fred E Finch, III
(74) *Attorney, Agent, or Firm* — Rabin & Berdo, P.C.

(57)          ABSTRACT

A switching control circuit for a power factor correction circuit configured to generate an output voltage from an alternating current (AC) voltage, the power factor correction circuit including an inductor configured to receive a rectified voltage corresponding to the AC voltage, and a transistor configured to control an inductor current flowing through the inductor. The switching control circuit is configured to control switching of the transistor. The switching control circuit includes: a driving signal output circuit configured to, when a peak value of the inductor current in a half cycle of the AC voltage is smaller than and greater than a first predetermined value, output a driving signal to operate the power factor correction circuit in a critical mode and in a continuous mode, respectively; and a driver circuit configured to drive the transistor, in response to the driving signal.

8 Claims, 9 Drawing Sheets

(56)     References Cited

U.S. PATENT DOCUMENTS

| | | | |
|---|---|---|---|
| 2015/0311816 A1 | 10/2015 | Ohshita et al. | |
| 2016/0241134 A1 | 8/2016 | Maruyama | |
| 2023/0412069 A1* | 12/2023 | Hung ................ | H02M 3/33515 |
| 2024/0372484 A1* | 11/2024 | Sankaranarayanan ....................... | H02M 7/53871 |

FOREIGN PATENT DOCUMENTS

| | | | |
|---|---|---|---|
| JP | 2014-191261 A | 10/2014 | |
| JP | 2014200174 A | 10/2014 | |
| JP | 2016-152679 A | 8/2016 | |
| JP | 2017-085865 A | 5/2017 | |
| JP | 2018-064410 A | 4/2018 | |
| JP | 2020-014325 A | 1/2020 | |
| WO | 2011052197 A1 | 5/2011 | |

* cited by examiner

SWITCHING CONTROL CIRCUIT AND POWER FACTOR CORRECTION CIRCUIT

CROSS-REFERENCE TO RELATED APPLICATION

The present application claims priority pursuant to 35 U.S.C. § 119 from Japanese patent application number 2022-138074 filed on Aug. 31, 2022, the entire disclosure of which is hereby incorporated by reference herein.

BACKGROUND

Technical Field

The present disclosure relates to a switching control circuit and a power factor correction circuit.

Description of the Related Art

There has been power factor correction circuits as power supply circuits that generate an output voltage at a target level from an alternating current (AC) voltage (e.g., see Japanese Patent Application Publication Nos. 2010-104218, 2020-14325, 2018-64410, 2017-85865, 2014-191261, and 2016-152679).

In the general power factor correction circuit that operates in a critical mode, a peak value of an inductor current of the power factor correction circuit increases with an increase in a load current flowing through a load. As a result, the magnetic saturation may occur in an inductor of the power factor correction circuit.

SUMMARY

A first aspect of an embodiment of the present disclosure is a switching control circuit for a power factor correction circuit configured to generate an output voltage at a target level from an alternating current (AC) voltage inputted thereto, the power factor correction circuit including an inductor configured to receive a rectified voltage corresponding to the AC voltage, and a transistor configured to control an inductor current flowing through the inductor, the switching control circuit being configured to control switching of the transistor, the switching control circuit comprising: a driving signal output circuit configured to, when a peak value of the inductor current in a half cycle of the AC voltage is smaller than a first predetermined value, output a driving signal to operate the power factor correction circuit in a critical mode, and when the peak value in the half cycle is greater than the first predetermined value, output the driving signal to operate the power factor correction circuit in a continuous mode; and a driver circuit configured to drive the transistor, in response to the driving signal.

A second aspect of an embodiment of the present disclosure is a power factor correction circuit, comprising: an inductor configured to receive a rectified voltage corresponding to an alternating current (AC) voltage; a transistor configured to control an inductor current flowing through the inductor; and a switching control circuit configured to control switching of the transistor, wherein the switching control circuit includes a driving signal output circuit configured to, when a peak value of the inductor current in a half cycle of the AC voltage is smaller than a first predetermined value, output a driving signal to operate the power factor correction circuit in a critical mode, and when the peak value in the half cycle is greater than the first predetermined value, output the driving signal to operate the power factor correction circuit in a continuous mode, and a driver circuit configured to drive the transistor, in response to the driving signal.

BRIEF DESCRIPTION OF THE DRAWINGS

FIG. 2 is a diagram illustrating an example of a power factor correction IC 25a.

FIG. 5 is a chart illustrating an example of main waveforms of the power factor correction IC 25a.

DETAILED DESCRIPTION

Figure 1:
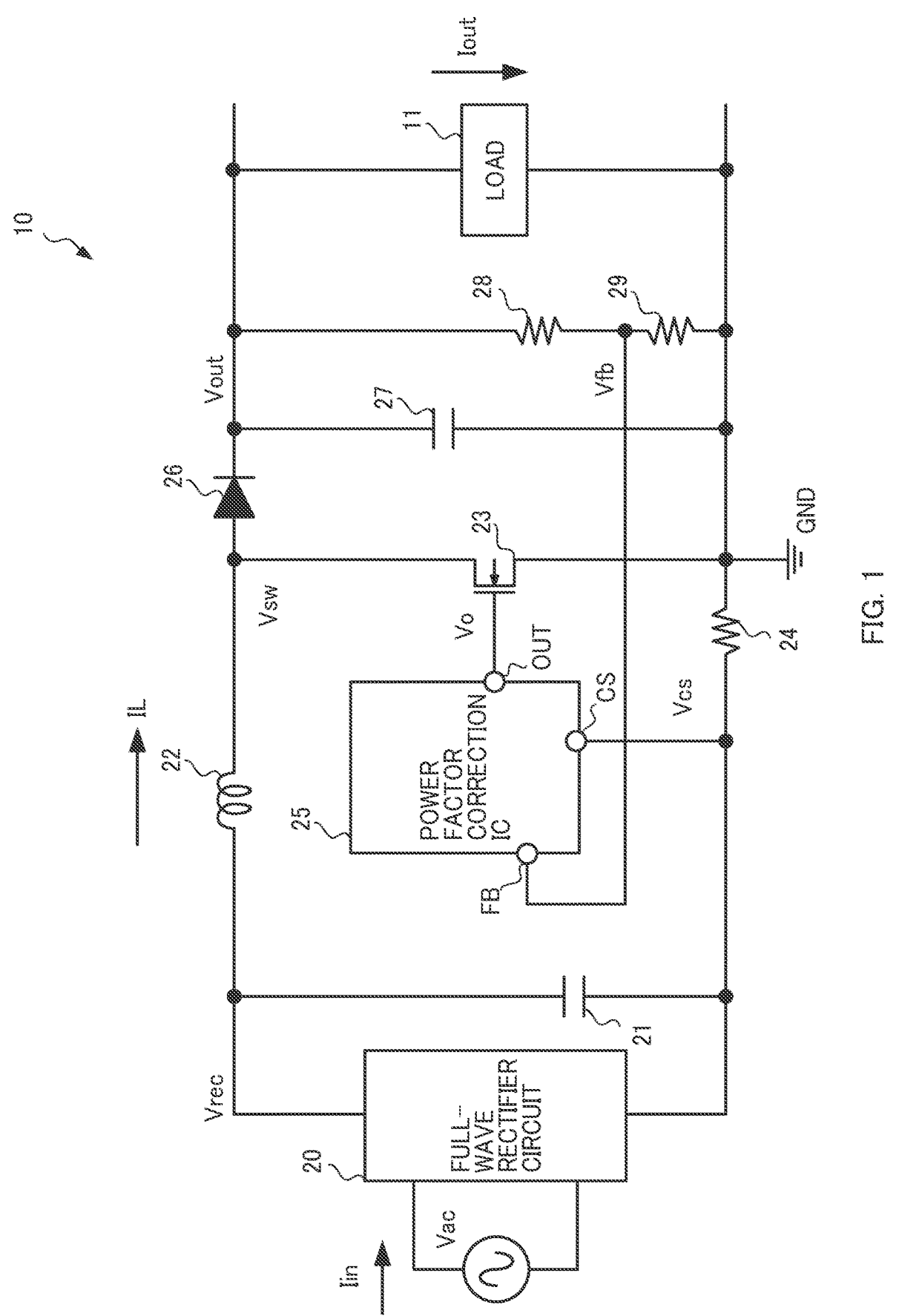
FIG. 1 is a diagram illustrating an example of a power factor correction circuit 10.

At least following matters will become apparent from the descriptions of the present specification and the accompanying drawings. Herein, the same or equivalent constituent elements, members, and the like illustrated in the drawings are given the same reference signs, and repetitive description thereof is omitted for convenience.

In an embodiment of the present disclosure, the term "couple" means to electrically couple unless otherwise noted. Thus, "coupling" includes a case where two components are coupled not only through wiring but also through a resistor, for example.

Embodiments

<<<Configuration of Power Factor Correction Circuit 10>>>

FIG. 1 is a diagram illustrating an example of a configuration of a power factor correction circuit 10 which is an embodiment of the present disclosure. The power factor correction circuit 10 is a boost chopper power supply circuit (here, an AC-DC converter) that generates an output voltage Vout at a target level from an alternating current (AC) voltage Vac of a commercial power supply while correcting a power factor.

Further, the power factor correction circuit 10 of an embodiment of the present disclosure operates in a "critical mode" or a "continuous mode", which will be described later in detail. Here, the "critical mode" is an operation mode in which a power transistor is turned on in response to an inductor current IL described later reaching zero. Meanwhile, the "continuous mode" is an operation mode in which the power transistor is turned on with the inductor current IL having a value greater than zero, that is, an operation mode in which the inductor current IL flows continuously.

Note that a load 11 is a step-down power supply circuit that generates a predetermined voltage (e.g., 15 V) upon receiving the output voltage Vout (e.g., 400 V). Further, in an embodiment of the present disclosure, a current flowing through the load 11 is referred to as load current Iout.

The power factor correction circuit 10 includes a full-wave rectifier circuit 20, capacitors 21 and 27, an inductor 22, an NMOS transistor 23, resistors 24, 28, and 29, a power factor correction IC 25, and a diode 26.

The full-wave rectifier circuit 20 full-wave rectifies the predetermined AC voltage Vac inputted thereto and applies a resultant voltage as a rectified voltage Vrec to the capacitor 21 and the inductor 22. Note that the AC voltage Vac is a voltage having an effective value in a range of 140 to 240 V and a frequency in a range of 50 to 60 Hz, for example.

Hereinafter, in an embodiment of the present disclosure, a voltage is basically a difference in potential relative to a reference point (GND in FIG. 1); however, the AC voltage Vac indicates a voltage across terminals. Further, a current inputted from the AC power supply to the power factor correction circuit 10 is referred to as input current Iin.

The capacitor 21 is an element that removes noise of the rectified voltage Vrec and also smooths the rectified voltage Vrec.

The inductor 22 configures a boost chopper circuit together with the NMOS transistor 23, the diode 26, and the capacitor 27. Thus, a charge voltage of the capacitor 27 is the direct-current (DC) output voltage Vout (e.g., 400 V). Note that, in an embodiment of the present disclosure, the current flowing through the inductor 22 is referred to as inductor current IL. Further, a voltage at a node at which the inductor 22 and the NMOS transistor 23 are coupled (i.e., a voltage at a drain electrode of the NMOS transistor 23) is referred to as voltage Vsw.

The NMOS transistor 23 is a switching device that controls power to the load 11 of the power factor correction circuit 10. Note that, in an embodiment of the present disclosure, the NMOS transistor 23 is an N-type metal oxide semiconductor (NMOS) transistor; however, for example, the NMOS transistor 23 may be a bipolar transistor or the like. Further, a gate electrode of the NMOS transistor 23 is coupled to a terminal OUT of the power factor correction IC 25 described later.

The resistor 24 is to detect the inductor current IL flowing through the inductor 22, and has one end coupled to a source electrode of the NMOS transistor 23 and the other end coupled to a terminal CS of the power factor correction IC 25. Note that, in an embodiment of the present disclosure, upon turning on of the NMOS transistor 23, the inductor current IL flows to the resistor 24 through the NMOS transistor 23, and upon turning off of the NMOS transistor 23, the inductor current IL flows to the resistor 24 through the diode 26 and the capacitor 27.

The power factor correction IC 25 is an integrated circuit that controls switching of the NMOS transistor 23 such that the level of the output voltage Vout reaches the target level (e.g., 400 V) while correcting the power factor. Specifically, the power factor correction IC 25 drives the NMOS transistor 23, based on the inductor current IL and a feedback voltage Vfb (described later).

The power factor correction IC 25, which will be described later in detail, has terminals CS, FB, and OUT. In an embodiment of the present disclosure, terminals other than the terminals CS and the like of the power factor correction IC 25 are omitted for the sake of convenience. Note that the power factor correction IC 25 corresponds to a "switching control circuit" that controls switching of the NMOS transistor 23.

The resistors 28 and 29 configure a voltage divider circuit that divides the output voltage Vout, to thereby generate the feedback voltage Vfb used in switching the NMOS transistor 23. Note that the feedback voltage Vfb generated at a node at which the resistors 28 and 29 are coupled is applied to the terminal FB.

<<<Configuration of Power Factor Correction IC 25a>>>

Figure 2:
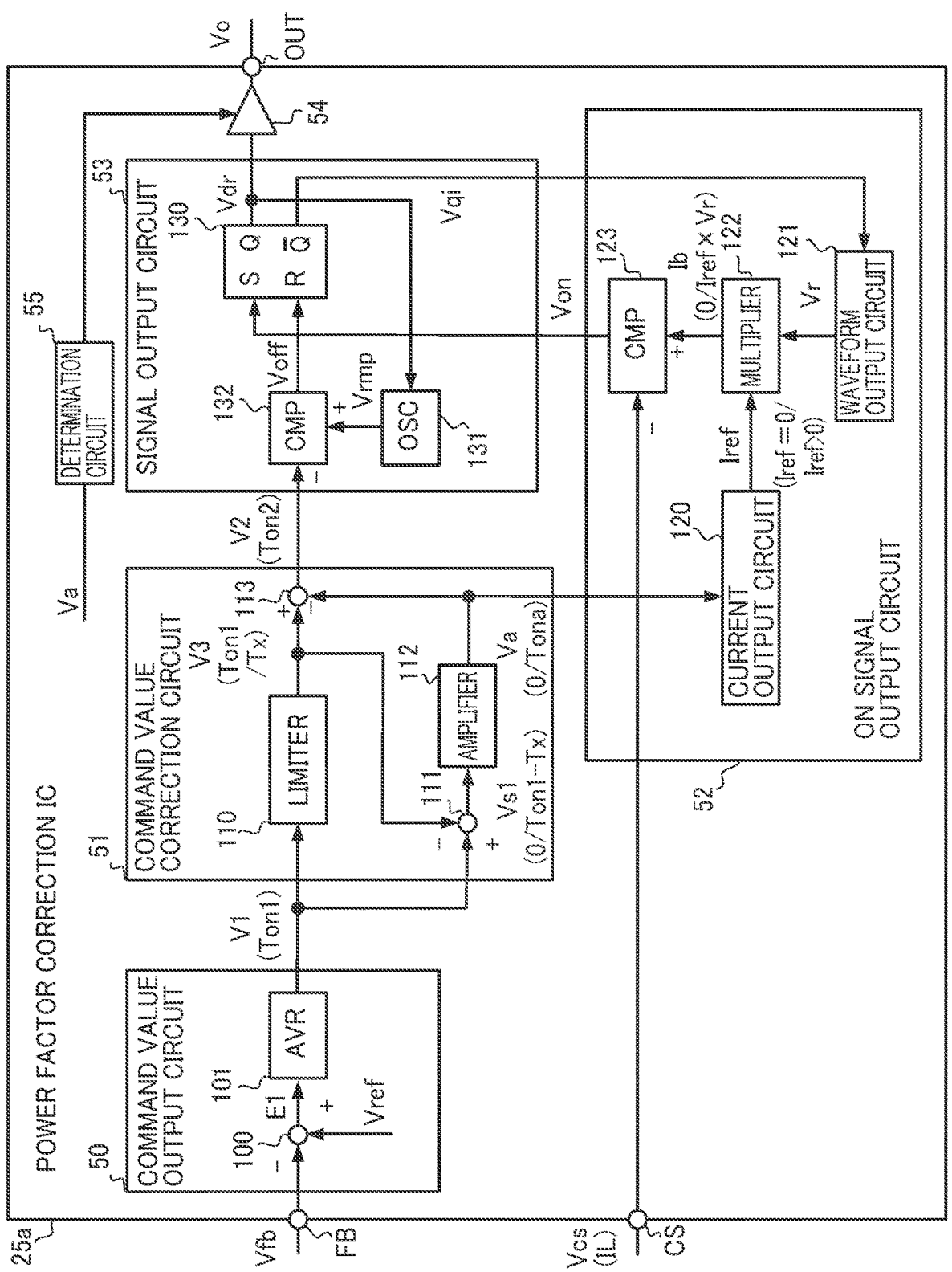

FIG. 2 is a diagram illustrating an example of a first embodiment of the power factor correction IC 25. A power factor correction IC 25a includes a command value output circuit 50, a command value correction circuit 51, an ON signal output circuit 52, a signal output circuit 53, a driver circuit 54, and a determination circuit 55. Note that the command value output circuit 50, the command value correction circuit 51, the ON signal output circuit 52, and the signal output circuit 53 of an embodiment of the present disclosure correspond to a "driving signal output circuit".

Note that a voltage Vcs is a voltage obtained by converting the inductor current IL at the resistor 24 as described above. Accordingly, for example, in a case where the ON signal output circuit 52 uses the voltage Vcs, this may be described as the ON signal output circuit 52 using the inductor current IL, for the sake of convenience.

Further, an analog-to-digital (AD) converter that converts the voltage Vfb into a digital value is provided at the terminal FB, and an AD converter that converts the voltage Vcs into a digital value is provided at the terminal CS in an embodiment of the present disclosure, although they are omitted for the sake of convenience. Accordingly, each of the circuits of the power factor correction IC 25 of an embodiment of the present disclosure process a digital value unless otherwise stated.

==Command Value Output Circuit 50==

The command value output circuit 50 outputs a command value V1 to cause the output voltage Vout to reach the target level, based on the feedback voltage Vfb and the reference voltage Vref corresponding to the output voltage Vout at the target level.

Note that the command value V1 of an embodiment of the present disclosure is a voltage whose level rises when the feedback voltage Vfb is smaller than the reference voltage Vref and drops when the feedback voltage Vfb is greater than the reference voltage Vref. Hereinafter, a "command value" described in an embodiment of the present disclosure is a voltage whose level changes, as with the command value V1.

Further, in an embodiment of the present disclosure, when the level of the command value V1 rises, an ON period of the NMOS transistor 23 increases, and when the level of the command value V1 lowers, the ON period of the NMOS transistor 23 decreases, which will be described later in detail. Hereinafter, the ON period of the NMOS transistor 23 corresponding to the command value V1 is referred to as "ON period Ton1".

The command value output circuit 50 includes a subtractor 100 and a regulator adjustor (AVR) 101. The subtractor 100 subtracts the feedback voltage Vfb from the reference voltage Vref, to thereby calculate an error μl between the feedback voltage Vfb and the reference voltage Vref.

The voltage regulator 101 outputs the command value V1 to match the level of the feedback voltage Vfb with the level of the reference voltage Vref, according to the error μl. Note that the subtractor 100 and the voltage regulator 101 correspond to, for example, a so-called error amplifier circuit that amplifies and integrates the error μl.

Note that the command value output circuit 50 corresponds to a "first command value output circuit", the command value V1 corresponds to a "first command value", and the ON period Ton1 corresponds to a "first time period".

==Overview of Command Value Correction Circuit 51==

The command value correction circuit 51 corrects the command value V1 so as to reduce the ON period of the NMOS transistor 23, in response to the load 11 entering an overload state, for example. Here, the term "overload" means that the load current Iout flowing through the load 11 is greater than a rated current. Specifically, for example, when the rated current is 8 A, the "overload" state means a state in which the load current Iout is greater than 8 A.

Note that the load 11 being in a "no load" state means being in a state in which the load current Iout is zero, and the load 11 being in a "light load" state means being in a state in which the load current Iout is smaller than a predetermined value (e.g., 1 A) that is sufficiently smaller than the rated current. Further, the load 11 being in a "rated load" state means being in a state in which the load current Iout of an amount of the predetermined rated current (e.g., 8 A) flows.

When the load 11 is in the overload state, the output voltage Vout drops, and thus the above-described command value output circuit 50 outputs the command value V1 that increases the time period during which the NMOS transistor 23 is on. Here, a relationship between the ON period of the NMOS transistor 23 and a peak value of the inductor current IL will be described with reference to FIGS. 3 and 4.

<<Example of Waveform of Main Nodes of Power Factor Correction Circuit 10>>

Figure 3:
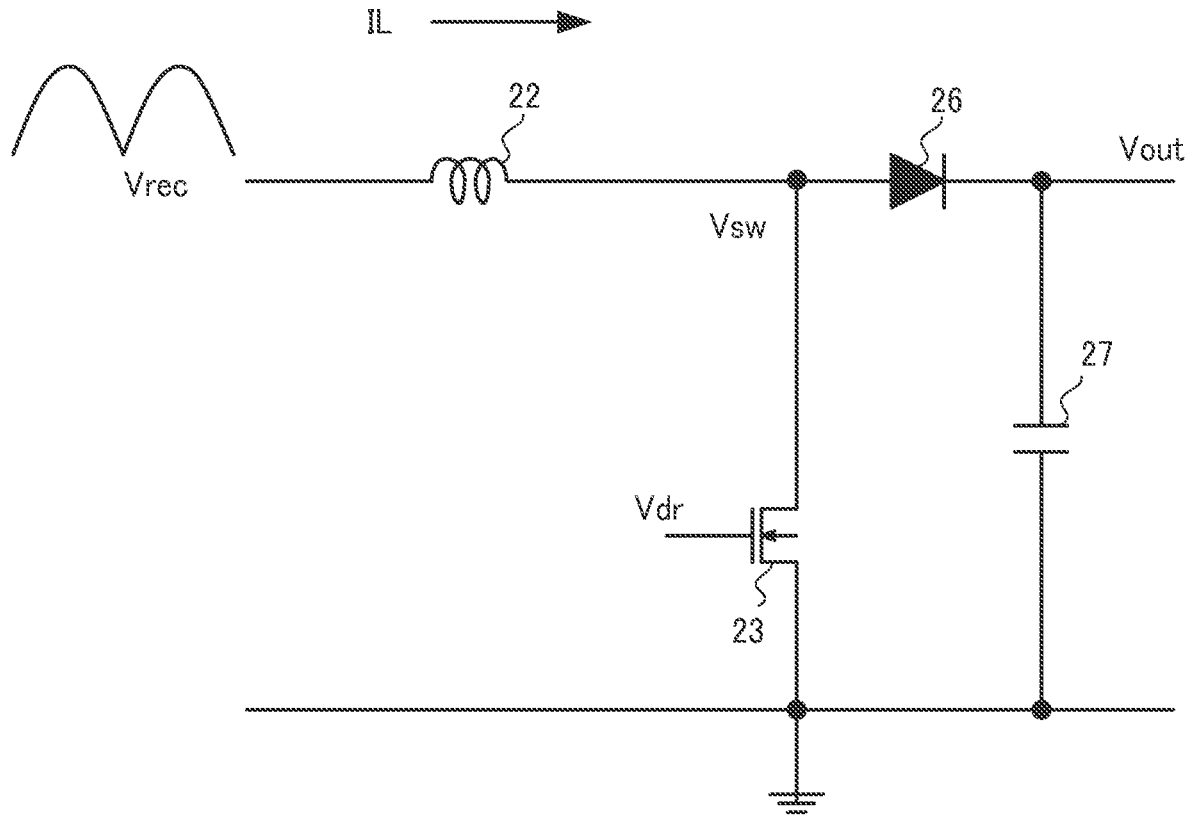
FIG. 3 is a diagram illustrating a configuration of a part of the power factor correction circuit 10.
Figure 4:
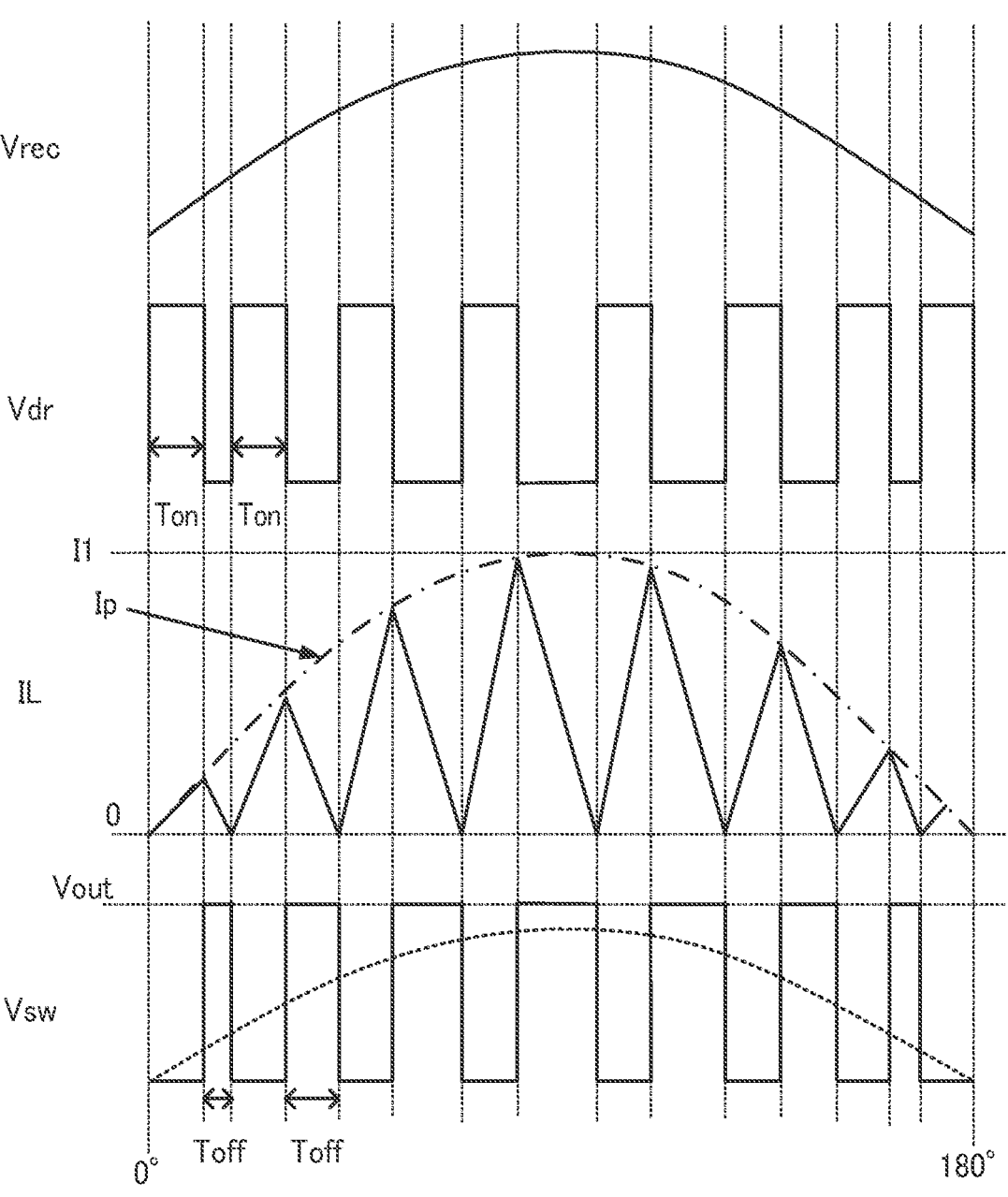
FIG. 4 is a chart illustrating an example of main waveforms of the power factor correction circuit 10.

FIG. 3 is a diagram illustrating a configuration of a part of the power factor correction circuit 10, and FIG. 4 is a chart illustrating an example of waveforms of main nodes of the power factor correction circuit 10. Note that, here, an example of the waveforms when the power factor correction circuit 10 operates in a so-called critical mode is illustrated.

In an embodiment of the present disclosure, as illustrated in FIG. 3, the rectified voltage Vrec obtained by full-wave rectifying the AC voltage Vac is applied to the inductor 22. Thus, a peak value Ip of the inductor current IL is expressed by the following expression (1):

$$Ip=(Vrec/L) \times Ton \tag{1}$$

where L is an inductance of the inductor 22, and Ton is the ON period of the NMOS transistor 23.

Note that the rectified voltage Vrec changes according to sin θ, where θ is a phase angle of the AC voltage Vac.

FIG. 4 illustrates an overview of the waveform of a half cycle of the AC voltage Vac (i.e., in a range of the phase angle θ from 0° to 180°), and an envelope of the peak value Ip is given by a dashed-dotted line. The peak value Ip reaches the maximum when the phase angle θ is 90° in the half cycle of the AC voltage Vac.

Further, in an OFF period Toff during which the NMOS transistor 23 is off, the inductor current IL decreases from the peak value Ip to zero. Accordingly, the following expression (2) holds:

$$Ip=((Vout-Vrec)/L) \times Toff \tag{2}.$$

Moreover, the following expression (3) holds by using the expressions (1) and (2):

$$Toff/(Ton+Toff)=Vrec/Vout \tag{3}.$$

Accordingly, as can be seen from the expression (3) and the lowest in FIG. 4, in the power factor correction circuit 10, it is possible to figure out the rectified voltage Vrec, based on a duty ratio of the OFF period Toff (Toff/(Ton+Toff)) during which the NMOS transistor 23 is off. Note that the duty ratio of the OFF period Toff is determined based on the proportion of the OFF period Toff to the switching cycle (Ton+Toff).

<<Peak Value Tp and ON Time Period Ton when Load 11 is in Overload State>>

For example, when the load 11 is in the overload state and the ON period Ton increases, the peak value Ip increases as can be seen from FIG. 4 and the expression (1). As a result, the magnetic saturation may occur in the inductor 22.

Accordingly, in response to the peak value Ip exceeding a predetermined value I1, at which the load 11 enters the overload state, for example, it is needed to reduce the ON period Ton and suppress the rising of the peak value Ip. The command value correction circuit 51 in FIG. 2 processes the command value V1 so as to reduce the ON period of the NMOS transistor 23, in response to the load 11 entering the overload state and the ON period Ton1 exceeding a predetermined time period Tx. Note that, hereinafter, a description will be given referring the ON period of the NMOS transistor 23 obtained with the power factor correction IC 25a in FIG. 2 to as "Ton1" or "Ton2", which will be described later in detail.

Here, the "predetermined time period Tx" is the ON period in which the peak value Ip reaches the predetermined value I1 as given by an expression (4):

$$Tx=I1 \times (L/Vrec(\theta=90°)) \tag{4}$$

where Vrec is a value when the phase angle θ is 90°.

In an embodiment of the present disclosure, when the load 11 enters the overload state, the ON period Ton1 indicated by the command value V1 reaches the predetermined time period Tx. Thus, the command value correction circuit 51 compares the ON period Ton1 with the predetermined time period Tx corresponding to the predetermined value I1, instead of directly comparing the peak value Ip with the predetermined value I1. Note that the predetermined time period Tx corresponds to a "first predetermined time period", and the predetermined value I1 corresponds to a "first predetermined value".

==Details of Command Value Correction Circuit 51==

As illustrated in FIG. 2, the command value correction circuit 51 includes a limiter 110, subtractors 111 and 113, and an amplifier 112.

When the ON period Ton1 indicated by the command value V1 is longer than the predetermined time period Tx, the limiter 110 limits the ON period corresponding to the command value V1 to the predetermined time period Tx. Specifically, when the ON period Ton1 indicated by the command value V1 is shorter than the predetermined time period Tx, the limiter 110 outputs a command value V3 corresponding to the ON period Ton1. Further, when the ON period Ton1 indicated by the command value V1 is longer than the predetermined time period Tx, the limiter 110 outputs the command value V3 corresponding to the ON period being the predetermined time period Tx.

Note that, when the ON period Ton1 and the predetermined time period Tx are equal to each other, the limiter 110 of an embodiment of the present disclosure operates as with a case where the ON period Ton1 is shorter than the predetermined time period Tx. Accordingly, substantially, when the ON period Ton1 indicated by the command value V1 is equal to or shorter than the predetermined time period Tx, the limiter 110 outputs the command value V3 corresponding to the ON period Ton1.

Here, for example, in the description of "V3(Ton1/Tx)" given in FIG. 2, a value when the limiter 110 does not operate is given on the left side of the slash (here, a mark of "/") in the brackets, and a value when the limiter 110 operates is given on the right side of the slash. Note that, the same applies to descriptions using a slash in brackets in the drawings in an embodiment of the present disclosure.

The subtractor 111 subtracts the command value V3 from the command value V1, to thereby output a subtraction result Vs1 (=V1−V3) indicating a difference between the ON period Ton1 and the predetermined time period Tx. Note that, when the ON period Ton1 is shorter than the predetermined time period Tx, the ON period corresponding to the command value V3 is the ON period Ton1. Accordingly, the subtraction result Vs1 in this case is 0 (zero).

When the ON period Ton1 is longer than the predetermined time period Tx, the amplifier 112 amplifies the subtraction result Vs1 by a predetermined gain μl, to thereby output a resultant voltage as a voltage Va. Here, the voltage Va is a value obtained by amplifying the difference between the ON period Ton1 and the predetermined time period Tx by the predetermined gain μl. Accordingly, as with the command value V1 and the like, the voltage Va is also a value corresponding to the ON period of the NMOS transistor 23. Note that, in an embodiment of the present disclosure, the ON period indicated by the voltage Va is referred to as ON period Tona.

The subtractor 113 subtracts the voltage Va indicating the ON period Tona from the command value V3, to thereby output a resultant value as a command value V2. Here, when the ON period Ton1 is shorter than the predetermined time period Tx, the voltage Va is zero. Accordingly, the subtractor 113 outputs the command value V2 indicating that the ON period Ton2 is equal to the ON period Ton1.

Meanwhile, when the ON period Ton1 is longer than the predetermined time period Tx, the subtractor 113 outputs the command value V2 indicating that the ON period Ton2 is (Tx−Tona). Accordingly, in this case, the subtractor 113 outputs the command value V2 for the NMOS transistor 23 to be on for a time period shorter than the predetermined time period Tx.

Note that the command value correction circuit 51 corresponds to a "second command value output circuit", the command value V2 corresponds to a "second command value", and the ON period Ton2 corresponds to a "second time period". The command value V3 outputted by the limiter 110 corresponds to a "third command value", the subtractor 111 corresponds to a "first subtractor", and the subtractor 113 corresponds to a "second subtractor".

==ON Signal Output Circuit 52==

The ON signal output circuit 52 outputs a signal Von at a high level (hereinafter, referred to as high or high level) to turn on the NMOS transistor 23, in response to the inductor current IL reaching a current Ib (described later). The ON signal output circuit 52 includes a current output circuit 120, a waveform output circuit 121, a multiplier 122, and a comparator (CMP) 123.

Based on the voltage Va, the current output circuit 120 outputs a reference current Iref as a reference of the current Ib (described later). It is described here for the sake of convenience that the current output circuit 120 outputs the reference current Iref; however, in actuality, the current output circuit 120 outputs a voltage of a digital value indicating the reference current Iref. In the power factor correction IC 25a, unless otherwise stated, the "current" in the power factor correction IC 25a means a "voltage indicating the current".

Further, when the ON period Ton1 is limited and the power to the load 11 is insufficient, the current output circuit 120 of an embodiment of the present disclosure executes predetermined calculation to compensate for the insufficient power. Specifically, according to the voltage Va, that is an amount corresponding to the shortage of the ON period of Ton2 outputted by the command value correction circuit 51 with respect to the output Ton1 of the command value output circuit 50, the current output circuit 120 converts the shortage of the input current Iin caused by the shortage of the ON period into an effective value. Since the current peak value Ip is proportional to the ON period and an average value is also proportional to the ON period, it is possible to obtain the effective value by multiplication by a proportionality coefficient P.

Note that, for example, assuming that the effective value of the rectified voltage Vrec is Vrec_rms, the proportionality coefficient P is mVrec_rms/2L. Note that a coefficient of 2 in the denominator of the expression described above is based on that a half of the peak value reaching with respect to an ON period is an average value within a switching cycle. With the use of the above-described proportionality coefficient P, it is possible to convert the ON period into the current value. Note that, in a case of converting the current value into the ON period, an inverse of the proportionality coefficient P may be used, for example.

As a result, when the ON period Ton1 is shorter than the predetermined time period Tx and the voltage Va is zero, the current output circuit 120 outputs the reference current Iref having a value of zero. Further, when the ON period Ton1 is longer than the predetermined time period Tx and the voltage Va indicates the ON period Tona, the current output circuit 120 outputs the reference current Iref having a value (here, a positive value greater than zero) obtained by multiplying the voltage Va by a constant P.

The waveform output circuit 121 outputs a waveform Vr similar to a waveform of the rectified voltage Vrec, in response to a signal Vqi, which is outputted from the signal output circuit 53 (described later) and is high during a time period in which the NMOS transistor 23 is off. As illustrated in the lowest of FIG. 4, the waveform output circuit 121 generates the waveform Vr by averaging the signals Vqi, similar to the voltage Vsw, in several switching cycles, for example.

The multiplier 122 multiplies the reference current Iref by the waveform Vr, to thereby output a voltage indicating the current Ib (instantaneous value). Note that, for the sake of convenience, a description is given here as appropriate assuming that the multiplier 122 outputs the current Ib. Further, in an embodiment of the present disclosure, when the value of the reference current Iref is zero, the current Ib is also zero. Meanwhile, when the reference current Iref is determined by the voltage Va and the constant P, the current Ib is expressed by Ib=Iref×Vr=Va×P×Vr; therefore, the current Ib also has a waveform similar to that of the rectified voltage Vrec. In this case, the current that is insufficient due to the ON period Ton2 being shorter than the ON period Ton1 is compensated for by adding the current Ib, and thus the input current Iin of the power factor correction circuit 10 is maintained at an initial value (i.e., a value when the NMOS transistor 23 is on for the ON period Ton1).

The comparator 123 compares the inductor current IL and the current Ib, based on the voltage Vcs and the voltage indicating the current Ib. When the inductor current IL is greater than the current Ib, the comparator 123 outputs a low signal Von. Meanwhile, when the inductor current IL is smaller than the current Ib, the comparator 123 outputs the high signal Von.

Note that the current output circuit 120, the waveform output circuit 121, and the multiplier 122 of an embodiment of the present disclosure correspond to a "first output circuit", and the comparator 123 corresponds to a "second output circuit". Further, the current output circuit 120 corresponds to a "reference current output circuit", and the multiplier 122 corresponds to an "arithmetic circuit". The current Ib where Ib=0 zero (predetermined value) corresponds to a "first current", and the current Ib where Ib=Irefx Vr(=VaxPxVr) corresponds to a "second current".

==Signal Output Circuit 53==

The signal output circuit 53 outputs a driving signal Vdr to drive the NMOS transistor 23, based on the signal Von and the command value V2. The signal output circuit 53 includes an SR flip-flop 130, an oscillator (OSC) 131, and a comparator 132.

The SR flip-flop 130 changes the driving signal Vdr, which is an output Q, to high, based on the high signal Von, and changes the driving signal Vdr to low, based on a high signal Voff (described later). Note that, the SR flip-flop 130 outputs the signal Vqi obtained by inverting the logic level of the output Q.

In response to the driving signal Vdr going high, the oscillator 131 outputs a ramp wave Vrmp whose amplitude rises from zero. Note that, in response to the driving signal Vdr going low, the oscillator 131 changes the amplitude of the ramp wave Vrmp to zero.

The comparator 132 compares the command value V2 and the ramp wave Vrmp, to thereby output the high signal Voff to turn off the NMOS transistor 23. Specifically, when the ramp wave Vrmp is smaller than the command value V2, the comparator 132 outputs a low signal Voff. Meanwhile, when the ramp wave Vrmp is greater than the command value V2, the comparator 132 outputs the high signal Voff to turn off the NMOS transistor 23.

As a result, when the ON period Ton2 indicated by the command value V2 has elapsed since turning on of the NMOS transistor 23, the comparator 132 is able to turn off the NMOS transistor 23.

==Driver circuit 54==

The driver circuit 54 is a buffer circuit that drives the NMOS transistor 23, in response to the driving signal Vdr. The driver circuit 54 causes a signal Vo to be high to turn on the NMOS transistor 23, in response to the driving signal Vdr going high, and the driver circuit 54 causes the signal Vo to be low to turn off the NMOS transistor 23, in response to the driving signal Vdr going low.

==Determination Circuit 55==

The determination circuit 55 determines, based on the voltage Va, whether a time period during which the load 11 is in the overload state, that is, a time period during which the ON period Ton1 is longer than the predetermined time period Tx, exceeds a predetermined time period Ty (e.g., 5 ms). Note that, as described above, when the ON period Ton1 is longer than the predetermined time period Tx, the voltage Va is a positive value.

Further, when the time period during which the voltage Va is a positive value is longer than the predetermined time period Ty, the determination circuit 55 controls the driver circuit 54 so as to turn off the NMOS transistor 23. As a result, in an embodiment of the present disclosure, in response to the time period during which the load 11 is in the overload state increasing, switching of the NMOS transistor 23 is stopped, and supply of power to the load 11 is also stopped. This makes it possible to prevent the power factor correction circuit 10 from being broken by heat, for example, in an embodiment of the present disclosure. Note that the predetermined time period Ty corresponds to a "second predetermined time period".

<<<Operation of Power Factor Correction IC 25a>>>

Figure 5:
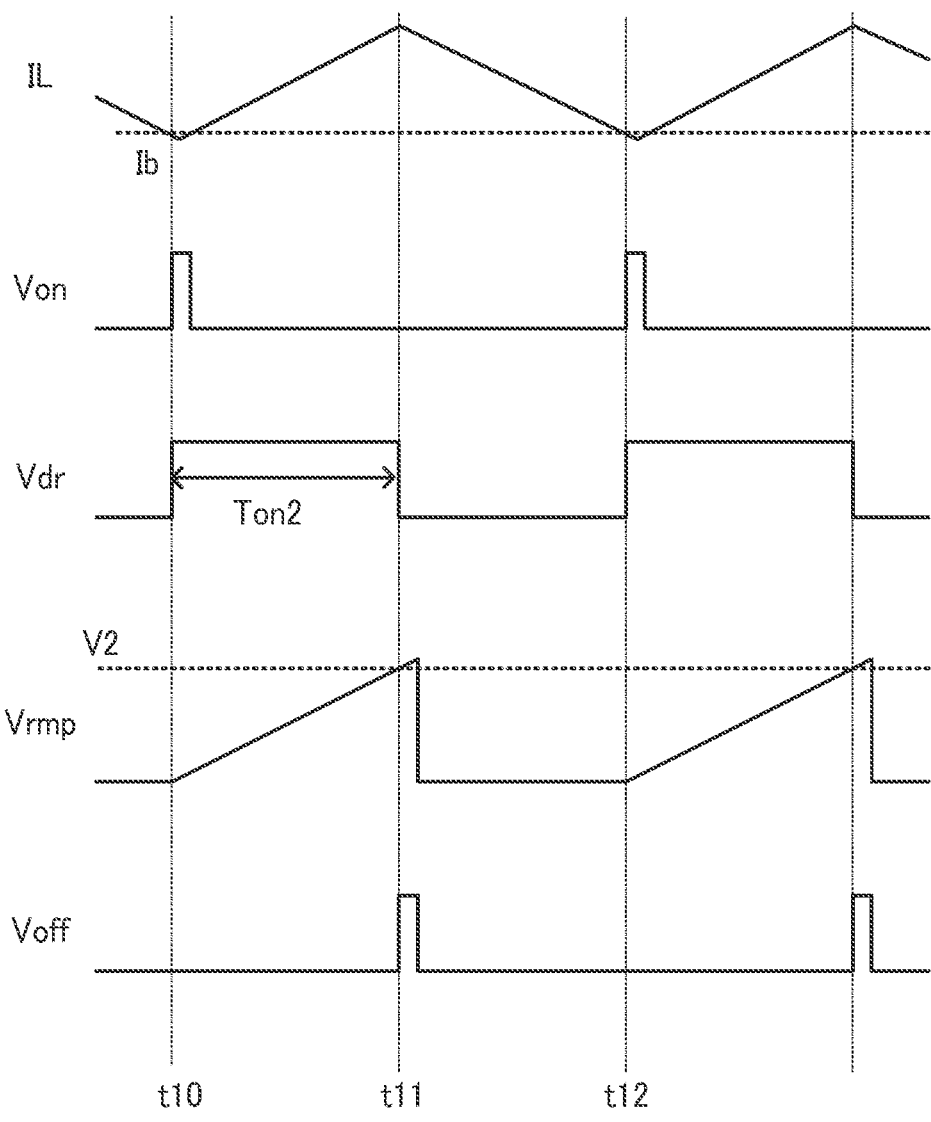
Figure 6A:
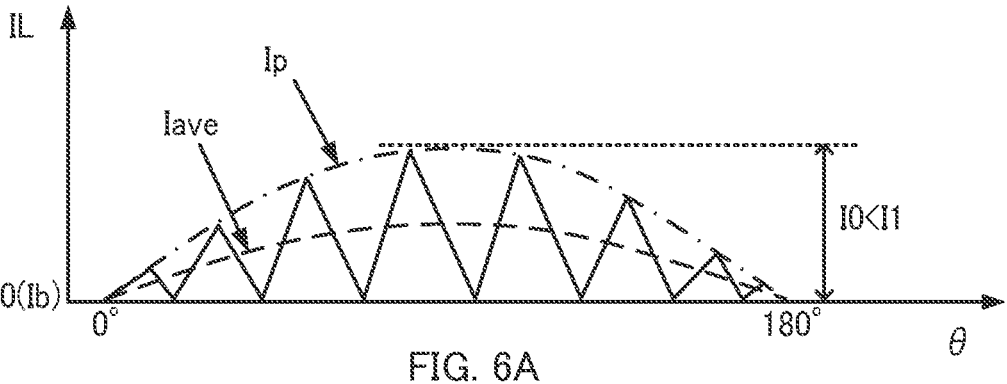
FIG. 6A is a chart describing an inductor current IL.
Figure 6B:
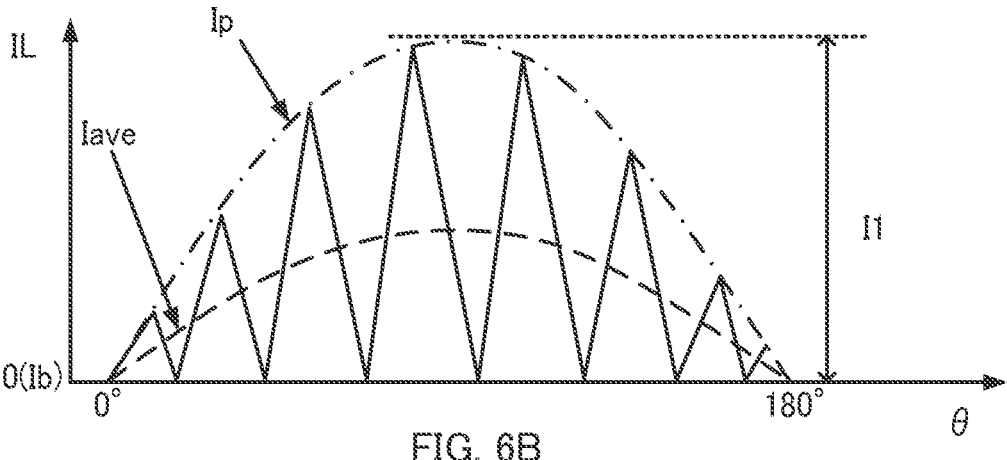
FIG. 6B is a chart describing an inductor current IL.
Figure 6C:
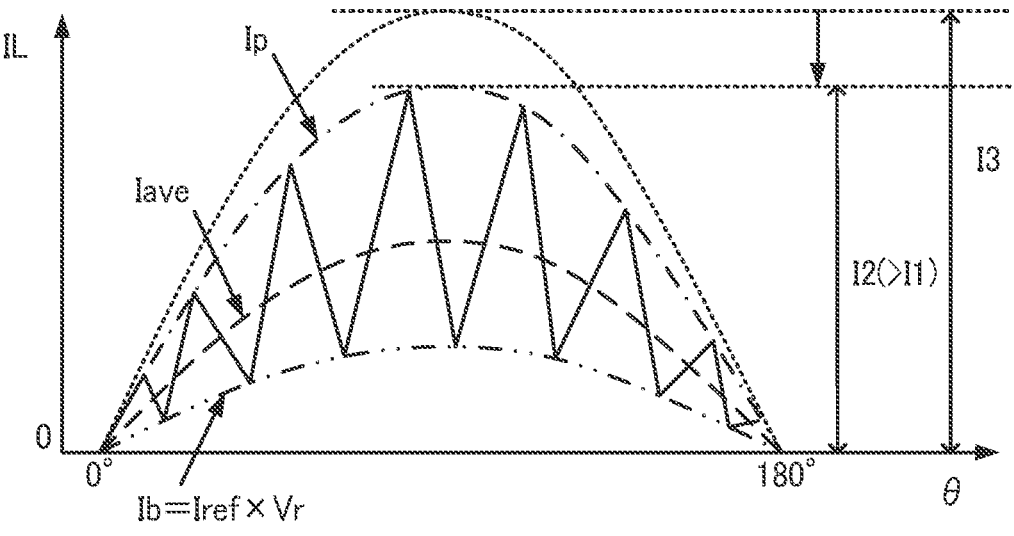
FIG. 6C is a chart describing an inductor current IL.
Figure 7:
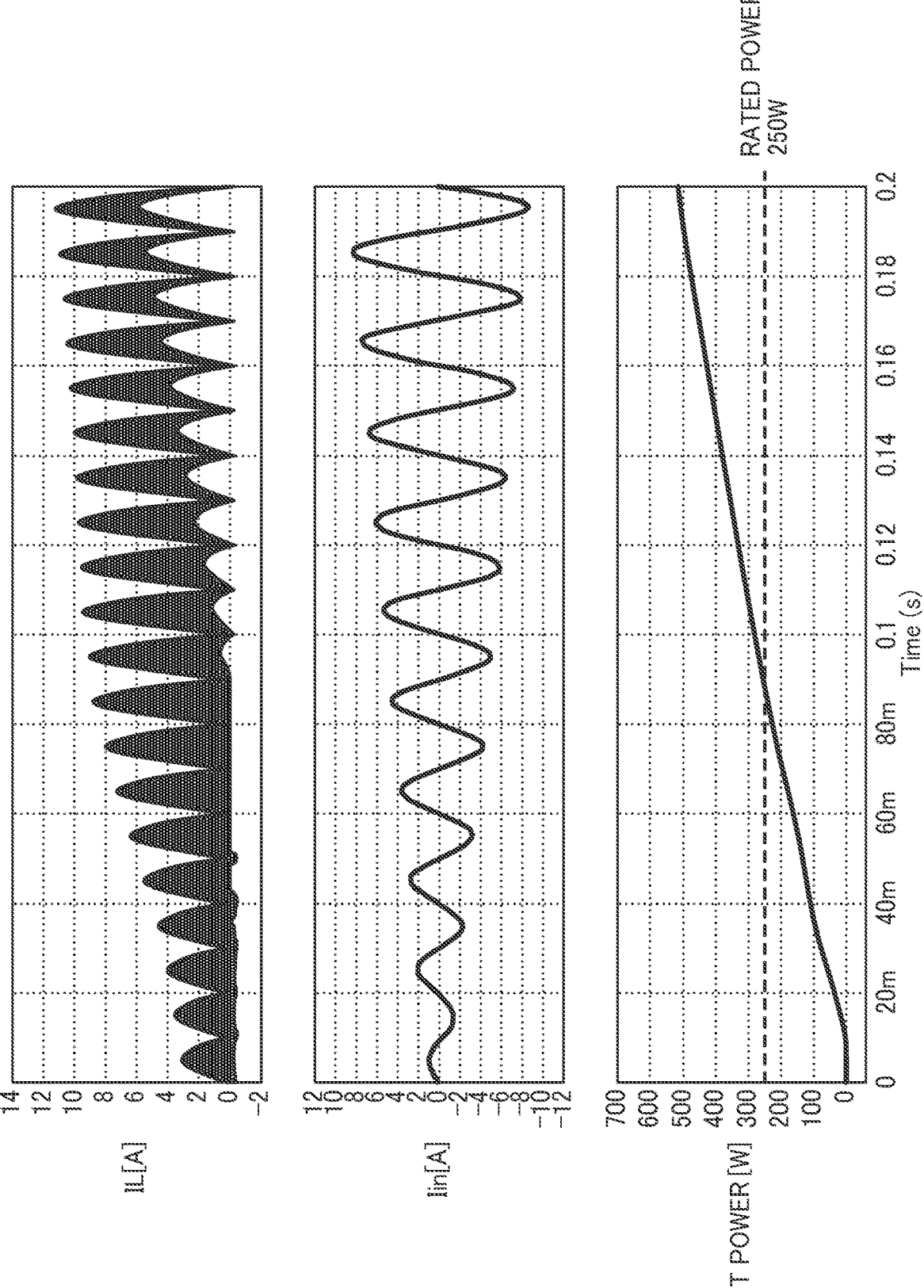
FIG. 7 is a chart describing an inductor current IL when a load current Iout increases.

An operation of the power factor correction IC 25a is described with reference to FIGS. 1, 2, and 5 to 7. FIG. 5 is a chart describing waveforms of main signals of the power factor correction IC 25a. FIGS. 6A to 6C are charts describing the inductor current IL when the power factor correction circuit 10 operates in the critical mode, and FIG. 7 is a diagram describing the inductor current IL when the power factor correction circuit 10 operates in the continuous mode.

Here, an operation of the power factor correction IC 25a when the load 11 changes from the light load state to the overload state through the rated load state are sequentially described.

==When Load 11 is in Light Load State==

The command value output circuit 50 in FIG. 2 outputs the command value V1, based on the feedback voltage Vfb and the reference voltage Vref, such that the output voltage Vout reaches the target level. Here, when the load 11 is in the light load state, the ON period Ton1 indicated by the command value V1 is shorter than the predetermined time period Tx, which is when the load 11 is in the overload state described above. Accordingly, the command value correction circuit 51 outputs the command value V2 indicating the ON period Ton1.

Further, since the command value V3 outputted from the limiter 110 and the command value V1 are equal to each other in this event, the voltage Va outputted from the amplifier 112 is zero. Accordingly, the multiplier 122 outputs the current Ib that is zero to the comparator 123.

Here, for example, in response to the inductor current IL decreasing to the current Ib (=0) at a time t10 in FIG. 5 after turning off of the NMOS transistor 23, the comparator 123 outputs the high signal Von.

As a result, the SR flip-flop 130 outputs the high driving signal Vdr, and thus the NMOS transistor 23 is turned on. Further, in response to the high driving signal Vdr being outputted, the amplitude of the ramp wave Vrmp from the oscillator 131 increases.

Then, in response to the amplitude level of the ramp wave Vrmp reaching the level of the command value V2 at a time t11, the comparator 132 changes the signal Voff to high. As a result, the SR flip-flop 130 is reset, to thereby output the low driving signal Vdr, and thus the NMOS transistor 23 is turned off. Note that a time period from time t10 to time t11 results in the ON period Ton2 indicated by the command value V2.

Upon turning off of the NMOS transistor 23, the inductor current IL decreases, and thus the operation from time t10 to time t12 are repeated from time t12. As a result, when the load 11 is in the light load state, the power factor correction circuit 10 operates in the critical mode, and the peak value Ip of the inductor current IL has a waveform given by a dashed-dotted line in FIG. 6A, for example. Note that, here, the peak value Ip is a current value I0 smaller than a predetermined value I1, which is a value of the peak value Ip when it is in the above-described rated load state. Further, a dotted line in FIG. 6A is an average value Iave of the inductor current IL.

==When Load 11 is in Rated Load State==

When the load 11 increases from the light load state to the rated load state, the ON period Ton1 indicated by the command value V1 reaches the predetermined time period Tx, which is when the load 11 is in the overload state described above. In this case, as described above, the limiter 110 outputs the command value V1 indicating the ON period Ton1.

Accordingly, as with a case where the load 11 is in the light load state, the power factor correction circuit 10 operates in the critical mode, as illustrated in FIG. 6B. Note that, in FIG. 6B, the peak value Ip of the inductor current IL is given by a dashed-dotted line, and an average value Iave of the inductor current IL is given by a dotted line. Further, in FIG. 6B, the peak value Ip increases from the current value I0 to the predetermined value I1.

==When Load 11 is in Overload State==

Even when the load 11 is in the overload state, the main signals of the power factor correction IC 25a change as with the case where the load 11 is in the light load state illustrated in FIG. 5. However, the ON period Ton1 indicated by the command value V1 is longer than the predetermined time period Tx, and thus the voltage Va is a positive value. Note that, here, the overload state is described by using an example of a state in which a current (e.g., 12 A) with a magnitude of 1.5 times that of the rated current (e.g., 8 A) flows, for example.

As a result, the command value correction circuit 51 outputs the command value V2 corresponding to the ON period Ton2 shorter than the ON period Ton1, and the ON signal output circuit 52 outputs a high signal Von when the inductor current IL reaches the current Ib (=Iref×Vr).

Accordingly, when the load 11 is in the overload state, the peak value Ip of the inductor current IL (dashed-dotted line) and the current Ib being the bottom value of the inductor current IL (dashed-two dotted line) both have a waveform Vr similar to the waveform of the rectified voltage Vrec, as illustrated in FIG. 6C. As such, when the load 11 is in the overload state, the power factor correction circuit 10 operates in the continuous mode.

Further, in an embodiment of the present disclosure, in response to the power factor correction circuit 10 operating in the continuous mode when it is in the overload state, the bottom value of the inductor current IL increases from zero. Thus, a current value I2 of the peak value Ip (dashed-dotted line) in this case is smaller than a current value I3 of the peak value Ip (dotted line) when the power factor correction circuit 10 temporarily operates in the critical mode. This is because, in order to increase the average value Iave by a desired amount in the critical mode, it is needed to increase the peak value Ip by twice the amount of the desired amount, but in the continuous mode, the added current Ib is used, as it is, as the increased amount of the average value Iave. Accordingly, it is possible to suppress an increase in the peak value Ip of the inductor current IL by using an embodiment of the present disclosure.

<<Simulation Result>>

FIG. 7 is a simulation result when the load current Iout increases in the power factor correction circuit 10 that uses the power factor correction IC 25a. FIG. 7 illustrates the inductor current IL, the input current Iin, and the input power of the AC power supply, sequentially, from a higher chart to a lower chart, respectively.

In FIG. 7, the load current Iout of the load 11 is set to 0 A at a time of 0 ms, and the load current Iout gradually increased, and thus, the input power also increases. Then, at a time about 90 ms, the load current Iout reaches the rated current (i.e., the load 11 is in the rated load state), and then the load current Iout is increased exceeding the rated current. Note that, in FIG. 7, the rated load is described as rated power.

As illustrated in FIG. 7, the power factor correction circuit 10 operates in the critical mode from time 0 ms to time 90 ms at which the load current Iout reaches the rated current. Thus, the peak value Ip of the inductor current IL rises with an increase in the load current Iout (or the input power).

At about time 90 ms, the load current Iout reaches the rated current, and thus the power factor correction circuit 10 operates in the continuous mode. Hence, even though the load current Iout increases, the bottom value of the inductor current IL increases, resulting in an increase in the peak value Ip being suppressed. Accordingly, in an embodiment of the present disclosure, it is possible to reduce the peak value Ip of the inductor current IL even when the load 11 is in the overload state.

<<<Configuration of Power Factor Correction IC 25b>>>

Figure 8:
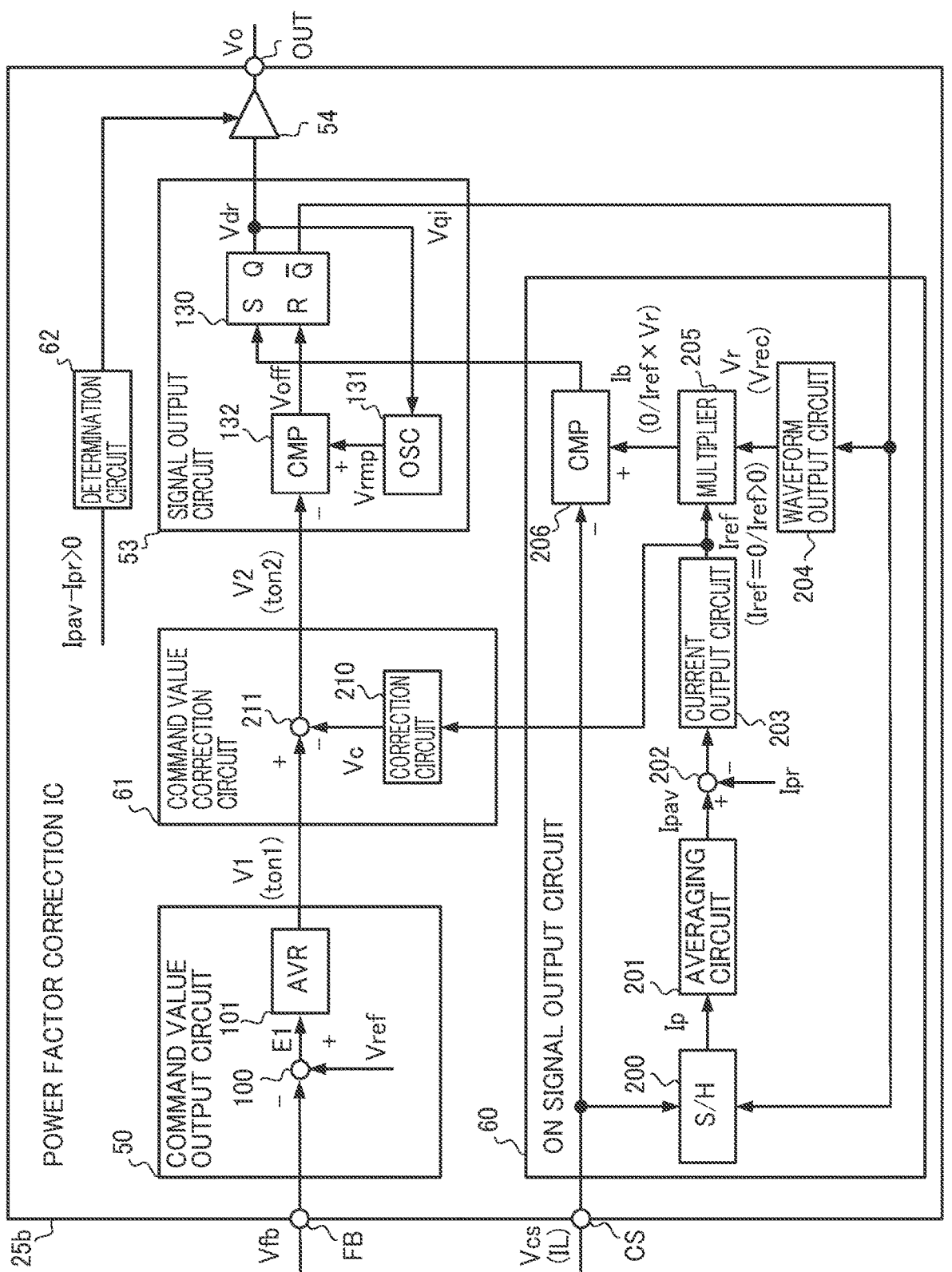
FIG. 8 is a diagram illustrating an example of a power factor correction IC 25b.

FIG. 8 is a diagram illustrating an example of a second embodiment of the power factor correction IC 25. As with the power factor correction IC 25a, a power factor correction IC 25b causes the power factor correction circuit 10 to operate from the critical mode to the continuous mode, in response to the load 11 entering the overload state.

The power factor correction IC 25a reduces the ON period of the NMOS transistor 23 and increases the current Ib, in response to the ON period Ton1 corresponding to the command value V1 exceeding the predetermined time period Tx. Meanwhile, the power factor correction IC 25b reduces the ON period of the NMOS transistor 23 and increases the current Ib, in response to the peak value Ip of the inductor current IL exceeding the predetermined value I1.

The power factor correction IC 25b includes the command value output circuit 50, the signal output circuit 53, the driver circuit 54, an ON signal output circuit 60, a command value correction circuit 61, and a determination circuit 62. Note that the command value output circuit 50, the signal output circuit 53, the ON signal output circuit 60, and the command value correction circuit 61 of an embodiment of the present disclosure correspond to a "driving signal output circuit".

Circuits given the same reference signs between the power factor correction IC 25b in FIG. 8 and the power factor correction IC 25a in FIG. 2 are the same. Accordingly, here a description will be given of the ON signal output circuit 60, the command value correction circuit 61, and the determination circuit 62.

==ON Signal Output Circuit 60==

The ON signal output circuit 60 includes a sample-and-hold circuit (S/H) 200, an averaging circuit 201, a subtractor 202, a current output circuit 203, a waveform output circuit 204, a multiplier 205, and a comparator (CMP) 206.

The sample-and-hold circuit 200 samples the inductor current IL in a timing when the NMOS transistor 23 is turned off. Specifically, the sample-and-hold circuit 200 obtains and holds the inductor current IL in response to the signal Vqi going high. As a result, the sample-and-hold circuit 200 obtains the peak value Ip of the inductor current IL every time the NMOS transistor 23 is switched. Note that the sample-and-hold circuit 200 corresponds to a "holding circuit".

The averaging circuit 201 calculates an average value Ipav of the peak value Ip in a time period of a half cycle of the AC voltage Vac.

The subtractor 202 subtracts a predetermined value Ipr from the average value Ipav. Here, the "predetermined value Ipr" is a value of the average value Ipav at the time when the load 11 is in the overload state and the peak value Ip in the half cycle reaches the predetermined value I1. Accordingly, when the average value Ipav is greater than the predetermined value Ipr and a subtraction result of the subtractor 202 is a positive value, the load 11 is in the overload state. Note that the predetermined value Ipr corresponds to a "second predetermined value".

The current output circuit 203 outputs the reference current Iref having a value that differs depending on the subtraction result of the subtractor 202. Specifically, when the load 11 is smaller than the rated load and the subtraction result of the subtractor 202 is equal to or smaller than zero (including a negative value), the current output circuit 203 outputs the reference current Iref that reaches zero so as to operate the power factor correction circuit 10 in the critical mode.

Meanwhile, when the load 11 is in the overload state and the subtraction result of the subtractor 202 is a positive value, the current output circuit 203 outputs the reference current Iref that increases according to the subtraction result so as to operate the power factor correction circuit 10 in the continuous mode.

The waveform output circuit 204, the multiplier 205, and the comparator 206 are the same as the waveform output circuit 121, the multiplier 122, and the comparator 123 in FIG. 2, respectively. Accordingly, the comparator 206 outputs the high signal Von to turn on the NMOS transistor 23, in response to the inductor current IL reaching the current Ib.

Note that the current output circuit 203, the waveform output circuit 204, and the multiplier 205 of an embodiment of the present disclosure correspond to a "first output circuit", and the comparator 206 corresponds to a "second output circuit". Further, the current output circuit 203 corresponds to a "reference current output circuit", and the multiplier 205 corresponds to an "arithmetic circuit". The current Ib where Ib=0 zero (predetermined value) corresponds to a "first current", and the current Ib where Ib=Iref× Vr corresponds to a "second current". Note that, here, the reference current Iref increases according to a difference between the average value Ipav and the predetermined value Ipr.

==Command Value Correction Circuit 61==

The command value correction circuit 61 corrects the command value V1 to reduce the ON period of the NMOS transistor 23, in response to the load 11 being in the overload state, for example. The command value correction circuit 61 includes a correction circuit 210 and a subtractor 211. Note that the command value correction circuit 61 corresponds to a "second command value output circuit".

The correction circuit 210 outputs a correction value Vc to correct the command value V1, the correction value Vc being obtained by multiplying the reference current Iref outputted from the current output circuit 203 by a predetermined value. Accordingly, when an amplitude of the reference current Iref is zero, the correction circuit 210 outputs the correction value Vc that is zero. Meanwhile, when the amplitude of the reference current Iref is a positive value, the correction circuit 210 outputs the correction value Vc having a positive value.

The subtractor 211 subtracts the correction value Vc from the command value V1, to thereby output the subtraction result as the command value V2. Accordingly, when the amplitude of the reference current Iref is zero and the correction value Vc is also zero, the subtractor 211 outputs the command value V1 as the command value V2. As a result, in this case, the ON period of the NMOS transistor 23 indicated by the command value V2 is the ON period Ton1 corresponding to the command value V1.

Meanwhile, when the correction circuit 210 outputs the correction value Vc of a positive value, the subtractor 211 outputs a value obtained by subtracting the correction value Vc from the command value V1 as the command value V2. As a result, in this case, the ON period of the NMOS transistor 23 indicated by the command value V2 is a time period shorter than the ON period Ton1.

Accordingly, in a case of using the power factor correction IC 25b of an embodiment of the present disclosure, when the load 11 is in the overload state, the bottom value of the inductor current IL is increased, and the ON period of the NMOS transistor 23 is reduced. As a result, the peak current (peak value Ip) caused by a switching ripple can be reduced while maintaining the needed input current Iin, thereby being able to suppress the entire peak current.

==Determination Circuit 62==

The determination circuit 62 determines whether the time period during which the load 11 is in the overload state exceeds the predetermined time period Ty (e.g., 5 ms), based on the average value Ipav and the predetermined value Ipr. Note that, as described above, when the load 11 is in the overload state, a difference between the average value Ipav and the predetermined value Ipr is a positive value. Accordingly, the determination circuit 62 determines whether a time period during which the difference between the average value Ipav and the predetermined value Ipr is a positive value exceeds the predetermined time period Ty.

Further, the determination circuit 62 controls the driver circuit 54 so as to turn off the NMOS transistor 23, in response to the time period during which the difference between the average value Ipav and the predetermined value Ipr is a positive value exceeding the predetermined time period Ty. As a result, in an embodiment of the present disclosure, in response to the time period during which the load 11 is in the overload state increasing, switching of the NMOS transistor 23 is stopped, and the supply of power to the load 11 is also stopped. This makes it possible to prevent the power factor correction circuit 10 from being broken by heat, for example, in an embodiment of the present disclosure.

==Summary of Power Factor Correction IC 25b==

As such, since the power factor correction IC 25b operates the power factor correction circuit 10 in the continuous mode when the load 11 is in the overload state, it is possible to reduce the peak value Ip of the inductor current IL more than in a case of keep operating the power factor correction circuit 10 in the critical mode.

==Others (Modifications of Command Value Correction Circuit 51)==

The command value correction circuit 51 in FIG. 2 includes the limiter 110, the subtractors 111 and 113, and the amplifier 112; however, it is not limited thereto. For example, instead of the command value correction circuit 51, a command value correction circuit 56 illustrated in FIG. 9 may be used.

The command value correction circuit 56 directly outputs the subtraction result of the subtractor 111 to the subtractor 113, without using the amplifier 112 of the command value correction circuit 51. In a case of using such a configuration, it is also possible to decrease the peak value Ip of the inductor current IL, as with an embodiment of the present disclosure. Note that the command value correction circuit 56 corresponds to a "second command value output circuit".

Summary

The power factor correction circuit 10 of an embodiment of the present disclosure has been described above. For example, the power factor correction ICs 25a and 25b operate the power factor correction circuit 10 in the critical mode until the load 11 enters the overload state, and in response to the load 11 entering the overload state, the power factor correction ICs 25a and 25b operate the power factor correction circuit 10 in the continuous mode. As a result, in an embodiment of the present disclosure, even when the load current Iout increases, it is possible to suppress a rise in the peak value Ip of the inductor current IL.

Further, in response to the ON period Ton1 corresponding to the command value V1 exceeding the predetermined time period Tx, the power factor correction IC 25a in FIG. 2 operates the power factor correction circuit 10 in the critical mode.

Figure 9:
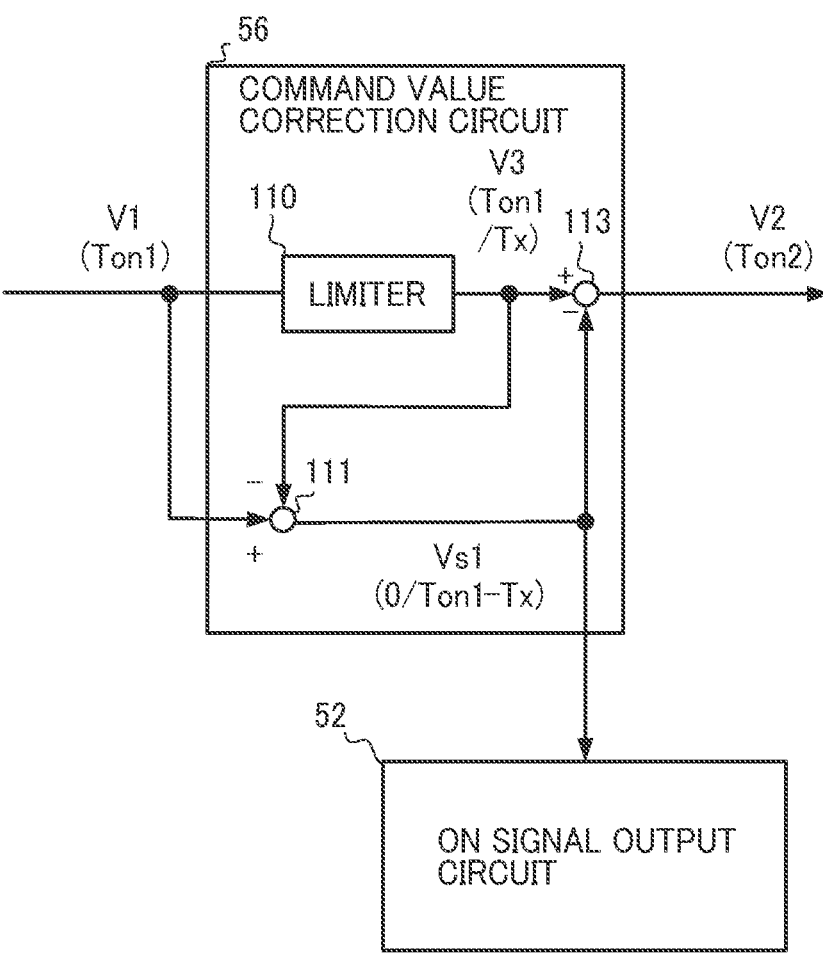
FIG. 9 is a diagram illustrating an example of a command value output circuit 56.

Moreover, for example, even in a case of using the command value correction circuit 56 illustrated in FIG. 9, it is also possible to suppress a rise in the peak value Ip of the inductor current IL when the load 11 is in the overload state. However, it should be noted that the command value correction circuit 51 includes the amplifier 112 in addition to the limiter 110. Accordingly, it is possible to reduce the ON period of the NMOS transistor 23 more than without the amplifier 112, in response to the ON period Ton1 corresponding to the command value V1 exceeding the predetermined time period Tx. Accordingly, it is possible to further reduce the peak value Ip when the load current Iout increases.

Furthermore, until the load 11 enter the rated load state, the comparator 123 outputs the high signal Von to turn on the NMOS transistor 23, in response to the inductor current IL reaching zero. Then, when the load 11 is in the overload state, the comparator 123 outputs the high signal Von to turn on the NMOS transistor 23, in response to the inductor current IL reaching the current Ib of a positive value. As a result, the power factor correction IC 25a can operate the power factor correction circuit 10 in the critical mode or in the continuous mode.

Further, when the load 11 is in the overload state, the multiplier 122 changes the current Ib, according to the waveform Vr. Accordingly, it is possible to sinusoidally change the bottom value of the inductor current IL.

Moreover, the waveform output circuit 121 generates the waveform Vr, based on the duty ratio at which the NMOS transistor 23 is turned off. Accordingly, for example, it is possible to sinusoidally change the current Ib without using the voltage divider circuit that divides the rectified voltage Vrec.

Furthermore, in response to the time period during which the load 11 is in the overload state exceeding the predetermined time period Ty, the determination circuit 55 causes the driver circuit 54 to turn off the NMOS transistor 23. As a result, in an embodiment of the present disclosure, the power factor correction circuit 10 can be prevented from being broken by heat.

Further, the power factor correction IC 25b in FIG. 8 operates the power factor correction circuit 10 in the critical mode, in response to the peak value Ip exceeding the predetermined value I1. Even in a case of using the power factor correction IC 25b as such, it is possible to suppress an increase in the peak value Ip of the inductor current IL when the load current Iout increases.

Moreover, as with the comparator 123, the comparator 206 outputs the high signal Von to turn on the NMOS transistor 23, in response to the inductor current IL reaching the current Ib. As a result, the power factor correction IC 25a can operate the power factor correction circuit 10 in the critical mode or in the continuous mode.

Furthermore, as with the waveform output circuit 121, the waveform output circuit 204 generates the waveform Vr, based on the duty ratio at which the NMOS transistor 23 is turned off. Accordingly, for example, it is possible to sinusoidally change the current Ib without using the voltage divider circuit that divides the rectified voltage Vrec.

Further, the command value correction circuit 61 includes the subtractor 211 that subtracts the correction value Vc from the command value V1, in response to the load 11 entering the overload state. As a result, the power factor correction IC 25b can reduce the ON period of the NMOS transistor 23, according to an increase in the load current Iout.

Moreover, the determination circuit 62 causes the driver circuit 54 to turn off the NMOS transistor 23, in response to the peak value Ip exceeding the predetermined value I1 and the time period during which the difference between the average value Ipav and the predetermined value Ipr is positive exceeding the predetermined time period Ty. This makes it possible to prevent the power factor correction circuit 10 from being broken by heat.

The present disclosure is directed to provision of a switching control circuit capable of suppressing an increase in a peak value of an inductor current when a load current increases.

According to the present disclosure, it is possible to provide a switching control circuit capable of suppressing an increase in a peak value of an inductor current when a load current increases.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A switching control circuit for a power factor correction circuit configured to generate an output voltage at a target level from an alternating current (AC) voltage inputted thereto, the power factor correction circuit including an inductor configured to receive a rectified voltage corresponding to the AC voltage, and a transistor configured to control an inductor current flowing through the inductor, the switching control circuit being configured to control switching of the transistor, the switching control circuit comprising:

a driving signal output circuit configured to, when a peak value of the inductor current in a half cycle of the AC voltage is smaller than a first predetermined value, output a driving signal to operate the power factor correction circuit in a critical mode, and when the peak value in the half cycle is greater than the first predetermined value, output the driving signal to operate the power factor correction circuit in a continuous mode; and a driver circuit configured to drive the transistor, in response to the driving signal, wherein the driving signal output circuit includes a first command value output circuit configured to output a first command value to cause the transistor to be on for a first time period, based on a feedback voltage corresponding to the output voltage and a reference voltage, a second command value output circuit configured to, when the first time period is shorter than a first predetermined time period, output a second command value to cause the transistor to be on for the first time period, and when the first time period is longer than the first predetermined time period, output the second command value to cause the transistor to be on for a second time period equal to or shorter than the first predetermined time period, an ON signal output circuit configured to, when the first time period is shorter than the first predetermined time period, output an ON signal to turn on the transistor, in response to the inductor current reaching a first current corresponding to the critical mode, and when the first time period is longer than the first predetermined time period, output the ON signal, in response to the inductor current reaching a second current corresponding to the continuous mode, and a signal output circuit configured to output the driving signal, based on the second command value and the ON signal, wherein the first predetermined time period is a time period during which the transistor is on when the peak value of the inductor current in the half cycle is the first predetermined value.

2. The switching control circuit according to claim 1, wherein the second command value output circuit includes a limiter configured to, when the first time period is shorter than the first predetermined time period, output a third command value to cause the transistor to be on for the first time period, and when the first time period is longer than the first predetermined time period, output the third command value to cause the transistor to be on for the first predetermined time period, a first subtractor configured to output a subtraction result obtained by subtracting the third command value from the first command value, an amplifier configured to amplify the subtraction result by a predetermined gain, and a second subtractor configured to subtract an output of the amplifier from the third command value, to thereby output a resultant value as the second command value.

3. The switching control circuit according to claim 1, wherein the ON signal output circuit includes a first output circuit configured to, when the first time period is shorter than the first predetermined time period, output the first current, and when the first time period is longer than the first predetermined time period, output the second current corresponding to a difference between the first time period and the first predetermined time period, and a second output circuit configured to output the ON signal, in response to the inductor current reaching a current outputted from the first output circuit.

4. The switching control circuit according to claim 3, wherein the first output circuit includes a reference current output circuit configured to, when the first time period is shorter than the first predetermined time period, output a reference current of a predetermined value, and when the first time period is longer than the first predetermined time period, output the reference current to have a value corresponding to the difference between the first time period and the first predetermined time period, and an arithmetic circuit configured to, when the first time period is shorter than the first predetermined time period, output the first current, based on the reference current of the predetermined value, and when the first time period is longer than the first predetermined time period, output, based on the reference current of the value corresponding to the difference and a waveform of the rectified voltage, the second current having an amplitude corresponding to the difference and a waveform similar to the waveform of the rectified voltage.

5. The switching control circuit according to claim 4, wherein the first output circuit includes a waveform output circuit configured to output the waveform of the rectified voltage, based on an OFF period in a switching cycle of the transistor.

6. The switching control circuit according to claim 1, further comprising:

a determination circuit configured to determine whether a time period during which the first time period is longer than the first predetermined time period exceeds a second predetermined time period, wherein the driver circuit turns off the transistor, in response to a result of determination by the determination circuit indicating that the time period during which the first time period is longer than the first predetermined time period exceeds the second predetermined time period.

7. A power factor correction circuit, comprising:

an inductor configured to receive a rectified voltage corresponding to an alternating current (AC) voltage;

a transistor configured to control an inductor current flowing through the inductor; and a switching control circuit configured to control switching of the transistor, wherein the switching control circuit includes a driving signal output circuit configured to, when a peak value of the inductor current in a half cycle of the AC voltage is smaller than a first predetermined value, output a driving signal to operate the power factor correction circuit in a critical mode, and when the peak value in the half cycle is greater than the first predetermined value, output the driving signal to operate the power factor correction circuit in a continuous mode, and a driver circuit configured to drive the transistor, in response to the driving signal, wherein the driving signal output circuit includes a first command value output circuit configured to output a first command value to cause the transistor to be on for a first time period, based on a feedback voltage corresponding to the output voltage and a reference voltage, a second command value output circuit configured to, when the first time period is shorter than a first predetermined time period, output a second command value to cause the transistor to be on for the first time period, and when the first time period is longer than the first predetermined time period, output the second command value to cause the transistor to be on for a second time period equal to or shorter than the first predetermined time period, an ON signal output circuit configured to, when the first time period is shorter than the first predetermined time period, output an ON signal to turn on the transistor, in response to the inductor current reaching a first current corresponding to the critical mode, and when the first time period is longer than the first predetermined time period, output the ON signal, in response to the inductor current reaching a second current corresponding to the continuous mode, and a signal output circuit configured to output the driving signal, based on the second command value and the ON signal, wherein the first predetermined time period is a time period during which the transistor is on when the peak value of the inductor current in the half cycle is the first predetermined value.

8. A switching control circuit for a power factor correction circuit configured to generate an output voltage at a target level from an alternating current (AC) voltage inputted thereto, the power factor correction circuit including an inductor configured to receive a rectified voltage corresponding to the AC voltage, and a transistor configured to control an inductor current flowing through the inductor, the switching control circuit being configured to control switching of the transistor, the switching control circuit comprising:

a driving signal output circuit configured to, when a peak value of the inductor current in a half cycle of the AC voltage is smaller than a first predetermined value, and an average value of the inductor current in the half cycle is a first value, output a driving signal to operate the power factor correction circuit in a critical mode, when the peak value in the half cycle is smaller than the first predetermined value, and the average value of the inductor current in the half cycle is a second value larger than the first value, output the driving signal to operate the power factor correction circuit in the critical mode, and when the peak value in the half cycle is greater than the first predetermined value, and the average value of the inductor current in the half cycle is a third value larger than the second value, output the driving signal to operate the power factor correction circuit in a continuous mode; and a driver circuit configured to drive the transistor, in response to the driving signal.

* * * * *